US008972868B2

(12) United States Patent
Schubert

(10) Patent No.: US 8,972,868 B2
(45) Date of Patent: Mar. 3, 2015

(54) TASK DECOMPOSITION WITH DATA AVAILABILITY

(75) Inventor: Harald Schubert, Mannheim (DE)

(73) Assignee: SAP AG, Walldorf (DE)

( * ) Notice: Subject to any disclaimer, the term of this patent is extended or adjusted under 35 U.S.C. 154(b) by 538 days.

(21) Appl. No.: 12/330,481

(22) Filed: Dec. 8, 2008

(65) Prior Publication Data

US 2010/0146427 A1    Jun. 10, 2010

(51) Int. Cl.
*G06F 3/00* (2006.01)
*G06Q 10/06* (2012.01)
*G06F 17/24* (2006.01)

(52) U.S. Cl.
CPC .............. *G06Q 10/06* (2013.01); *G06F 17/243* (2013.01)
USPC .......................................... 715/751; 715/753

(58) Field of Classification Search
USPC .......................................... 705/7.15; 715/771
See application file for complete search history.

(56) References Cited

U.S. PATENT DOCUMENTS

| 6,101,481 | A | * | 8/2000 | Miller | 705/7.13 |
| 2004/0210470 | A1 | * | 10/2004 | Rusk | 705/9 |
| 2005/0033626 | A1 | | 2/2005 | Kruse et al. | |
| 2006/0101328 | A1 | * | 5/2006 | Albornoz et al. | 715/512 |
| 2006/0143270 | A1 | | 6/2006 | Wodtke et al. | |
| 2007/0244736 | A1 | * | 10/2007 | Johnson | 705/8 |
| 2007/0282658 | A1 | * | 12/2007 | Brintle | 705/9 |
| 2009/0119601 | A1 | * | 5/2009 | Adachi et al. | 715/753 |

\* cited by examiner

*Primary Examiner* — Matt Kim
*Assistant Examiner* — William Trapanese
(74) *Attorney, Agent, or Firm* — Mintz Levin Cohn Ferris Glovsky and Popeo, P.C.

(57) ABSTRACT

The subject matter disclosed herein provides methods and apparatus, including computer program products, for task decomposition of a task of a workflow. In one aspect there is provided a method. The method may include selecting, for decomposition, a task from a workflow including a plurality of tasks; indicating whether one or more portions of information associated with the decomposed task are restricted; and providing, to another user interface, the decomposed task including the one or more restricted portions. The received command is executed at the database. Related systems, apparatus, methods, and/or articles are also described.

11 Claims, 5 Drawing Sheets

TASK DECOMPOSITION WITH DATA AVAILABILITY

FIELD

This disclosure relates generally to data processing and, more particularly, decomposing a task of a workflow.

BACKGROUND

In increasingly complex business operations, a business process might be formalized using a workflow management system. The workflow management system typically includes a workflow engine that generates work items according to activities defined as workflows supporting one or more business processes. As an example, an organization might have a set process for approval for particular activity and the workflow management system handles routing a corresponding work item among those individuals that need to sign off on the approval. For example, an employee desiring a vacation might initiate a "vacation approval" business object. A vacation application would then send an event to the workflow management system, along with a reference to the business object (vacation request) and the workflow management system would pick and start a workflow that corresponds to the triggering event. The vacation approval request would be routed among those others that would need to track, approve or just be notified of such a request, with a result of the work (e.g., approval, denial, etc.) routed back to the initiating employee.

The work items needing a particular person's input or notice might be presented to that person or role as an item on a worklist. In some cases, work items can be acted on directly from a presentation of a worklist, while others are acted on by the workflow participant taking an action outside the worklist. In addition, participants may have other tasks and collaborative events.

Some interactions might use the workflow management system in part and use unrelated applications in part. For example, a work item might be generated for handling by a user that prompts the user to make a decision that requires information not present in the work item. For example, the work item might specify that employee A wants to take N days of vacation from date D1 to date D2 and request an approval/rejection response from the participant to whom the work item is assigned. That participant might then have to obtain further information externally, such as by conferring with A's group manager and relevant project managers, as well as checking with a human resources department or human resources application to determine if A has sufficient vacation time available.

SUMMARY

The subject matter disclosed herein provides methods and apparatus, including computer program products, for decomposing tasks of a workflow.

In one aspect there is provided a method. The method may include selecting, for decomposition, a task from a workflow including a plurality of tasks; indicating whether one or more portions of information associated with the decomposed task are restricted; and providing, to another user interface, the decomposed task including the one or more restricted portions.

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWING

These and other aspects will now be described in detail with reference to the following drawings.

Like reference symbols in the various drawings indicate like elements.

DETAILED DESCRIPTION

Figure 1A:
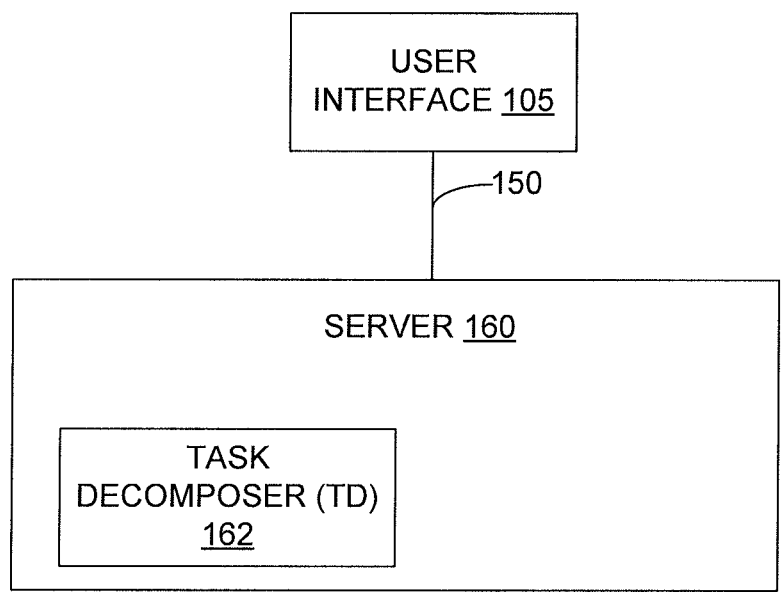
FIGS. 1A-B illustrates systems for task decomposition.

During the course of a running process (e.g., a process instance), tasks may need to be performed by a user (e.g., an approve an order). The most common way of realizing this is to assign such tasks as work items for a group of people (so-called "potential owners" of the task), and wait until someone (e.g., the so-called "task owner") in the group selects one or more of the tasks. When a user opens an assigned task using a user interface, the user interface enables the user to work on the task. The user interface will present information relevant to the processing of the task. In some cases, the user interface includes fields (or icons, etc.) to allow data to be entered into, for example, a form that will be relevant to subsequent processing (e.g., execution of the running process to approve or reject an order).

In some instances, it is often the case that a single task, although picked by a single user, requires information which is provided by other users (e.g., the actual task owner does not have the right information at hand to complete the task and must call someone else to obtain the right information). Traditional workflow systems do not support such scenarios. This is why ad-hoc actions, such as e-mails, phone calls, and the like, are used to get the information and correctly process the task. Recent improvements in workflow systems may allow for delegating a task (e.g., making another person the actual owner), but this seldom is the right mechanism to cope with the ad hoc situation. For example, the original owner of a task may not want to hand a task over to another user, the user may only need some information to complete the task of the worklist. Moreover, the original owner might not even be allowed to assign responsibility of the task over to another user because the task might contain sensitive information.

In some implementations, the subject matter may be used to decompose a task into a plurality of tasks. The original task owner may invite one or more other users to jointly solve a task by decomposing the task into one or more tasks (e.g., subtasks). When inviting one or more users to assist with a task, the original owner may restrict the data the invitee(s) may see or edit (e.g., data might be hidden, read-only, or not modifiable). This can be done for each invitee separately. The invitees may be presented via a user interface with the same form that the original task owner was presented with; however, the invitees may be presented with portions of the information (e.g., a form presented at the user interface) hidden, restricted, not editable, and the like. Furthermore, the original task owner may decide whether to have the task returned (e.g., in a task inbox) when the invitee provides information (e.g., in the case or the order approval above, the invitee may add information to the form presented at the user interface, and then the updated the form to the original task owner's inbox). In some cases, less critical tasks may not be controlled (i.e., returned to the original task owner's) inbox.

In some implementations, the advantage of task decomposition is that the original task owner configures the final outcome of the task before the task is completed. Moreover, the original task owner has control over which invitee is allowed to see or edit portions of information related to a task. In addition, a decomposed task allows the original task owner to better control the task outcome and impose visibility constraints. In contrast to the decomposed task approach described herein, a collaborative task approach does not have controls to, for example, restrict the visibility of data presented at a user interface since each participant has the same rights and can even complete the task.

FIG. 1 depicts a system 100 including a user interface 105 and a server 160, both of which are coupled by a communication mechanism 150, such as the Internet, an intranet, and the like.

User interface 105 may be implemented as processor including any type of interface mechanism for a user, such as a web browser, a client, a smart client, and any other presentation mechanism.

Server 160 may be implemented as any type of processor (e.g., a computer, a blade, and the like). Server 160 may also include a workflow application to control and process a workflow. Server 160 may also include a task decomposer 162 for decomposing a task. The task decomposer 162 may perform one or more of the task decomposition functions described herein including one or more aspects of process 200; generate form 400 (FIG. 4) for presentation (e.g., as an hyper text markup language page) at a user interface; control aspects of a workflow; receive from a user interface a selection for decomposing a task from a workflow including a plurality of tasks; receive, at the server, an indication from the user interface, the selection reflecting whether one or more portions of information (e.g., fields of the form 400) associated with the decomposed task are restricted; and provide to another user interface the decomposed task including the one or more restricted portions. In some implementations, the task decomposer 162 may decompose tasks for a workflow management system for managing tasks configured as a worklist.

Figure 1B:
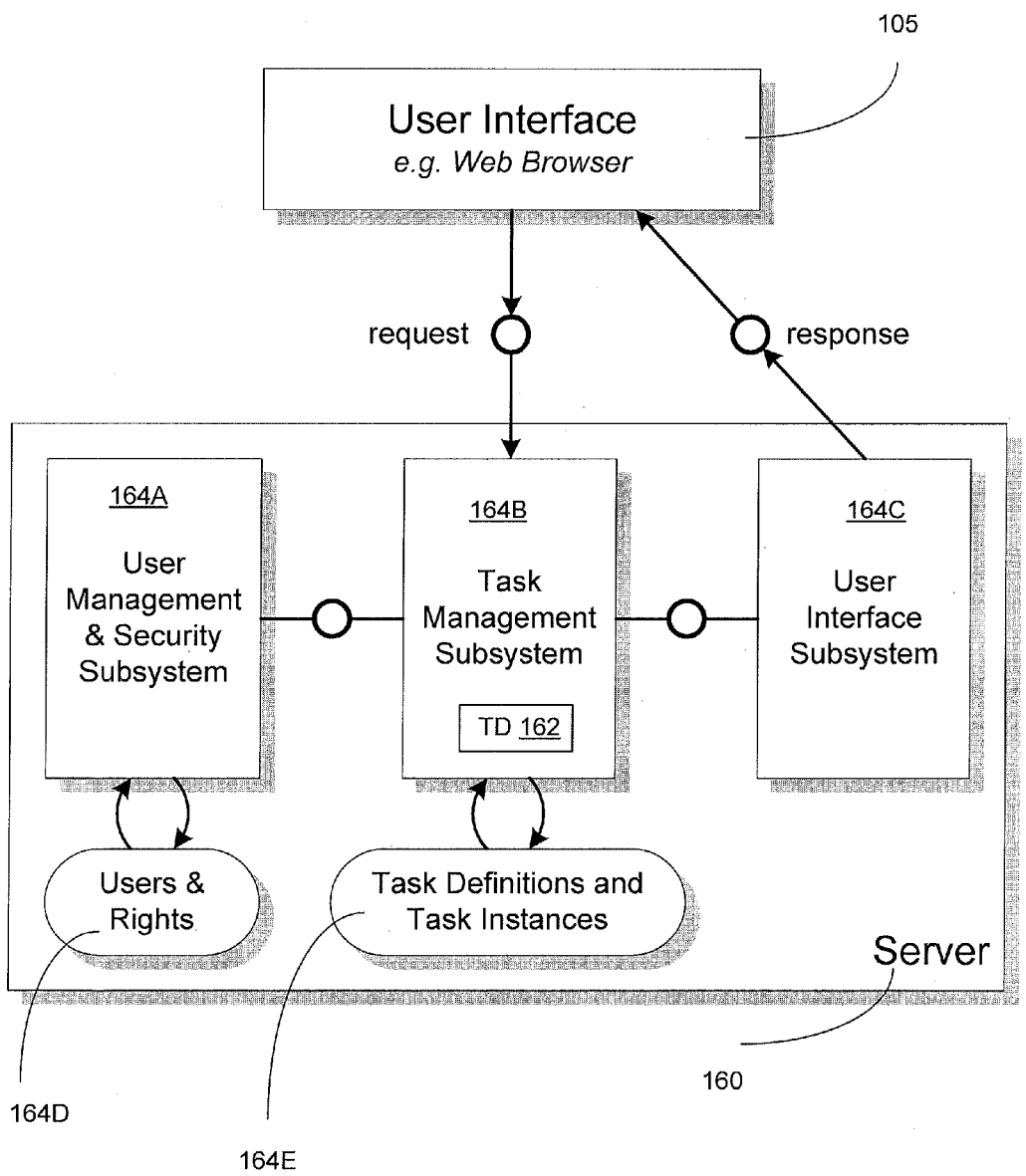
Figure 2:
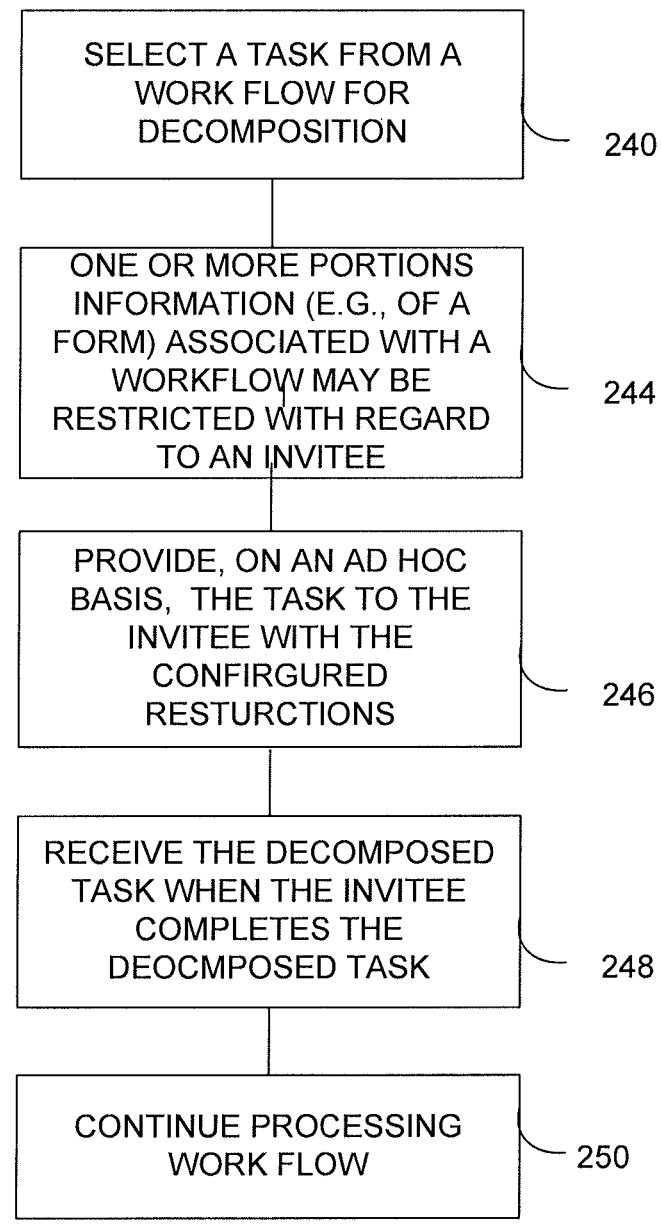
FIG. 2 illustrates a process for decomposing a task.

FIG. 2 depicts a process 200 for decomposing a task using, for example, system 100. The description of process 200 will also refer to FIGS. 1A-B and 3.

Figure 3:
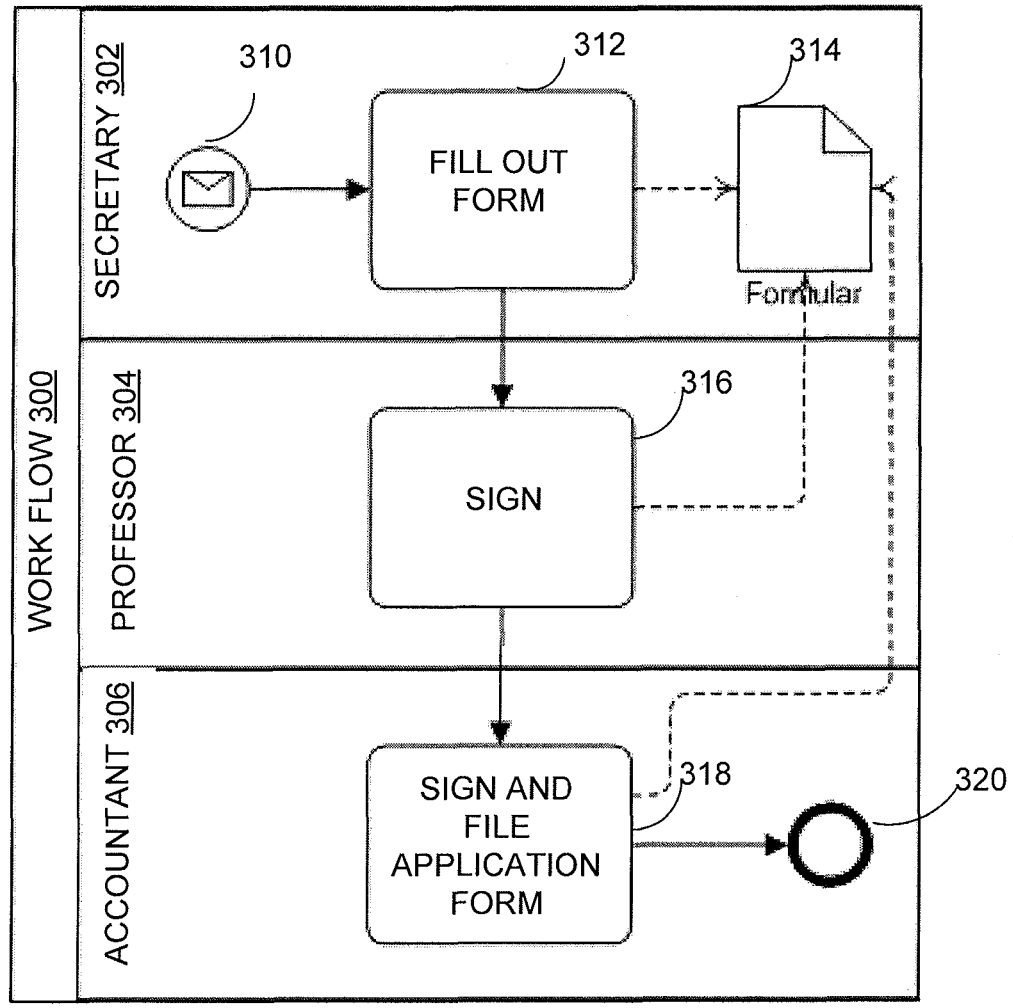
FIG. 3 depicts an example of a workflow 300.

At 240, a task is selected from a workflow for decomposition. For example, a user at user interface 105 may select a task for decomposition. The selected task may be a task selected from a workflow (and/or worklist) of tasks, such as tasks associated with a workflow management system. FIG. 3 depicts an example of a workflow 300 including three users (e.g., secretary 302, professor 304, and accountant 306). The workflow 300 includes receiving an application 310 (e.g., an application form is received at user interface 105 as an email from server 160) and filling out the application form 312 (e.g., by secretary 302 at user interface 105). During the completion of the form, the secretary 302 cannot complete the application form because the secretary 302 lacks sufficient information (e.g., the secretary is unsure of the salary amount to include on the application form). When this is the case, the secretary 302 may select the task 312 for decomposition.

At 244, one or more portions of the form may be restricted. For example, once task 312 of the workflow is selected for decomposition, the secretary 302 may restrict aspect to portions of the application form presented as a user interface. Returning to the above example, secretary 302 may restrict the entire application form as read-only except for the salary portion, for which the secretary 302 seeks input from another user. Moreover, the restriction may be made with regard to the other user (i.e., the invitee-user to whom the decomposed task is sent). For example, the restriction may expressly identify a user, a user's role, a user's function, a user's title, and the like, and then make the restriction to one or more portions (e.g., fields) of the application form. Although the previous example describes the restriction as a read-only restriction, other restrictions may be used as well including one or more of the following: hide a field, and a mask a field. For example, secretary 302 may want to hide information sensitive information regarding the person that is about to be hired to prevent an invitee from seeing that sensitive information.

At 246, the selected task (including any restrictions) may be provided to another user (e.g., a so-called invitee-user) on an ad hoc basis. For example, secretary 302 may decompose the task 312 into a subtask to obtain salary information and restrict the application form so that only that salary field can be modified. Next, secretary 302 may select another user (i.e., the invitee) to receive the selected decomposed task. For example, the salary subtask may be provided via email (either independently of the application form or as part of the application form) to another user, such as professor 304. In this example, the professor 304 may not know the salary and provide the decomposed task to an accountant 306. Professor 304 and accountant 306 would each have a corresponding user interface, such as user interface 105 coupled to server 160.

At 248, when a decomposed task is completed, the decomposed task is received at an inbox (e.g., at server 160), and an indication (e.g., an email or other like notification) is provided to the user, such as secretary 302 at user interface 105.

At 250, the workflow process may continue. For example, secretary 302 may complete using user interface 115 the form at 314, provide (e.g., via server 160) the completed application form for signature (or approval) to professor 304, and, once approved, professor 304 may send (e.g., by indicating approval at a user interface and selecting send) the application form to accountant 306 for final signature and filing (e.g., storage) of the application form. At 320, the workflow 300 is complete.

FIG. 1B depicts another implementation of system 100. Specifically, FIG. 1B depicts server 160 including a user management and security subsystem 164A for confirming the identity (e.g., with a login and password) of users, a task management subsystem 164B for managing (and/or controlling) the tasks of the work flow, and a user interface subsystem 164C for generating pages (e.g., hypertext markup language pages of for presentation at user interface 105 (e.g., pages including tasks, such as page 400). User management and security subsystem 164B may access information 164D regarding users of the system (e.g., a list of users and their rights). Task management subsystem 164B (which includes task decomposer 162 (labeled TD 162) may access information 164E defining the tasks of the workflow and the instances of those tasks in the workflow.

For example, when a task is decomposed, a request is sent from user interface 105 to task management subsystem 164B, where the task included in the request is decomposed by task decomposer 162. Next, the task decomposer 162 takes the request with the information about the invitees (to which the decomposed task will be sent) and, based on the information at user management & security subsystem 164A, confirms whether the secretary 302 has the appropriate rights to decompose the task and whether the invitees are authorized to provide the secretary with the missing information. If so, the task decomposer 162 decomposes the task into subtasks. Once the invitees open their work list at a user interface, they will find the new tasks assigned on to their name. Opening the task(s) will again result in a roundtrip to the server, which then in turn yields a response rendered by the user interface which essentially reflects the settings made by the secretary about which information is read-only, hidden, or modifiable by the invitee.

Figure 4:
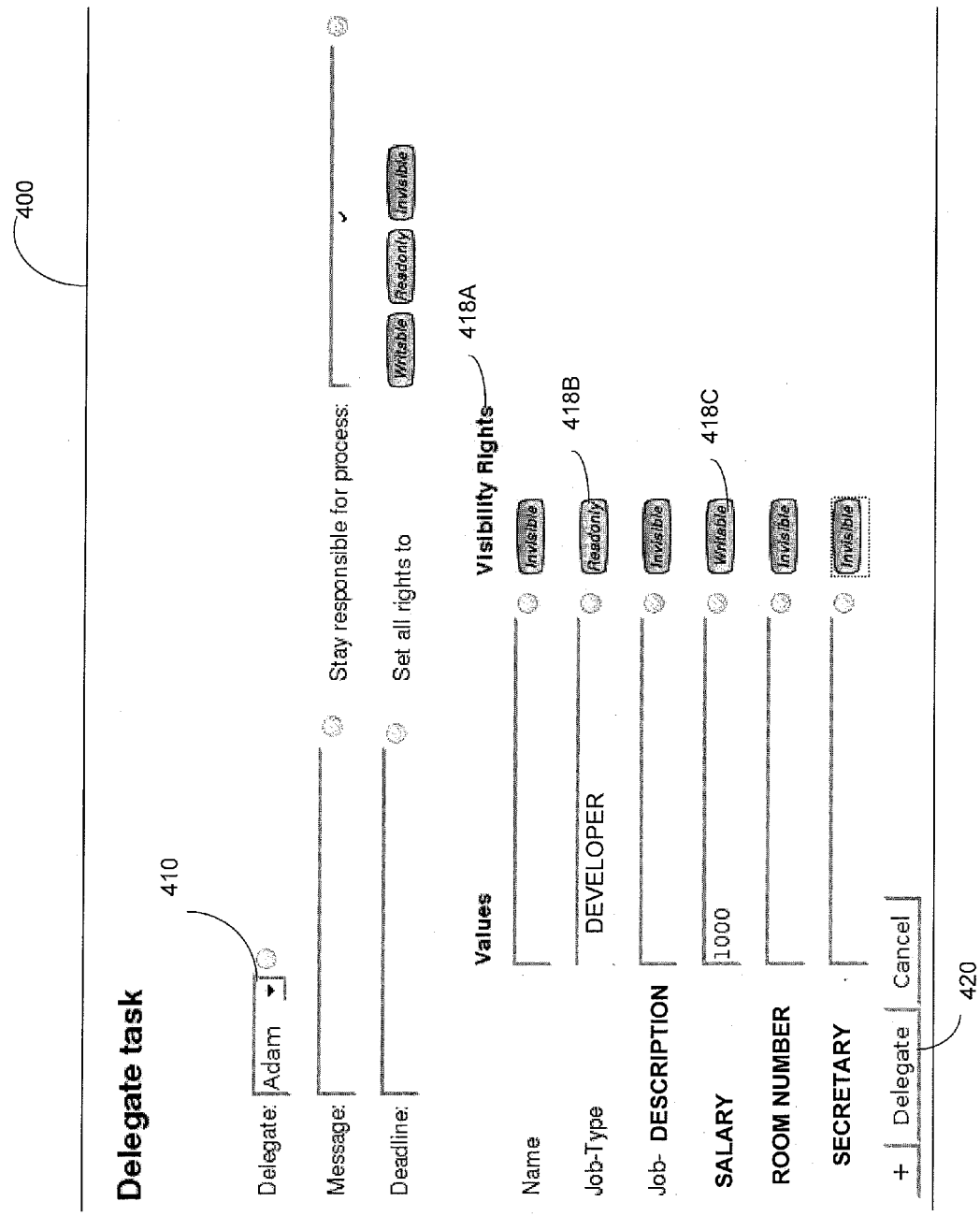
FIG. 4 depicts a form 400 used when decomposition a task and restricting the availability of data on that form.

FIG. 4 depicts an example of a form presented at user interface 105 for decomposition to another user. The user, for example, secretary 302 may be presented at user interface 105 with form 400 and then decompose a task by, for example, selecting which portions of form 400 will be provided to another user (e.g., an invitee). For example, the user may select Adam as the invitee and decompose the task by providing only the position name and salary. In the example of FIG. 4, the restrictions are listed as visibility rights 418A, and the job description is read-only 418B (i.e., the invitee can only read the description of developer and cannot change it), while the salary information is modifiable 418C (i.e., the invitee can write to that field in the form). Once the secretary is ready to delegate the decomposed task, the secretary may select delegate 420 to provide (e.g., send) that task via server 160 to the invitee which in this example is the user Adam.

Form 400 also includes other features, such as a message field to allow embedded messages (e.g., a message stating "help me with this subtask," "hello," "urgent," and so forth); a stay responsible for process field (e.g., the user that delegates the decomposed task maintains control and responsibility for the subtask within the overall workflow); a deadline field (e.g., to include a date for completion); and a set all rights field (e.g., to set all visibility rights 418A) to, for example, one of the listed restrictions (e.g., writable, read-only, and invisible).

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" may refer to any entity including a person or a computer.

The foregoing description is intended to illustrate but not to limit the scope of the invention, which is defined by the scope of the appended claims. Other embodiments are within the scope of the following claims.

What is claimed:

1. A computer-readable medium non-transitorily storing instructions that, when executed by at least one processor, cause the at least one processor to perform operations comprising:

receiving, at a server from a first machine, a request for decomposition of a task, the task comprising completion of an application form comprising a plurality of fields, the plurality of fields comprising a restricted field for which one or more invitees lack access permission, a second field for which information from the one or more invitees is required to complete the task, and a message field for which a message provided by the first machine is displayed to the one or more invitees, the request comprising identifications of the task for which the one or more invitees are allowed to assist with completion of the application form, an invitee of the one or more invitees, and the second field;

decomposing, by the server, the task into a plurality of subtasks, the decomposing comprising verifying that the first machine has permission to decompose the task and identifying at least one restricted field of the plurality of fields for which the invitee lacks an access permission, the decomposing further comprising generating a restricted version of the application form, the restricted version of the application form comprising at least one restricted portion of the application form, the restricted portion having an access control restricting access by the invitee to the at least one restricted field, the access control comprising a hidden field restriction that hides the at least one restricted field from being viewable by the invitee, the decomposing further including providing, by the first machine in the message field, the message viewable by the invitee, the message providing information for assisting with completion of the application form;

inviting the invitee to assist with completion of the at least one second field, the inviting comprising retaining responsibility by the first machine for completion of the task and completion of the subtask;

providing, by the server to a second machine and accessible by the invitee in response to detecting that the invitee has the restricted version of the application form, the at least one second field; and notifying, by the server to the first machine upon detection by the server, that the invitee has completed the at least one second field.

2. The computer-readable medium of claim 1, wherein the operations further comprise:

determining, at a user management and security system, whether an identity of an invitee of the plurality of invitees is authorized to receive the subtask to which the invitee is invited.

3. The computer-readable medium of claim 1, wherein the operations further comprise:
receiving, at the server, visibility rights of the plurality of fields of the application form, the visibility rights defining whether the invitee is authorized to view, read, and/or write the at least one field of the plurality of fields.

4. The computer-readable medium of claim 1, wherein the inviting further comprises adding each subtask to a worklist displayed in a second user interface of the second machine.

5. The computer-readable medium of claim 1, wherein the inviting further comprises sending an e-mail notification to the invitee, the e-mail notification containing the restricted version of the application form.

6. A computer-implemented method comprising:
receiving, at a server from a first machine, a request for decomposition of a task, the task comprising completion of an application form comprising a plurality of fields, the plurality of fields comprising a restricted field for which one or more invitees lack access permission, a second field for which information from the one or more invitees is required to complete the task, and a message field for which a message provided by the first machine is displayed to the one or more invitees, the request comprising identifications of the task for which the one or more invitees are allowed to assist with completion of the application form, an invitee of the one or more invitees, and the second field;
decomposing, by the server, the task into a plurality of subtasks, the decomposing comprising verifying that the first machine has permission to decompose the task and identifying at least one restricted field of the plurality of fields for which the invitee lacks an access permission, the decomposing further comprising generating a restricted version of the application form, the restricted version of the application form comprising at least one restricted portion of the application form, the restricted portion having an access control restricting access by the invitee to the at least one restricted field, the access control comprising a hidden field restriction that hides the at least one restricted field from being viewable by the invitee, the decomposing further including providing, by the first machine in the message field, the message viewable by the invitee, the message providing information for assisting with completion of the application form;
inviting the invitee to assist with completion of the at least one second field, the inviting comprising retaining responsibility by the first machine for completion of the task and completion of the subtask;
providing, by the server to a second machine and accessible by the invitee in response to detecting that the invitee has the restricted version of the application form, the at least one second field; and
notifying, by the server to the first machine upon detection by the server, that the invitee has completed the at least one second field.

7. The computer-implemented method of claim 6 further comprising:
determining, at a user management and security system, whether an identity of an invitee of the plurality of invitees is authorized to receive the subtask to which the invitee is invited.

8. The computer-implemented method of claim 6 further comprising:
receiving, at the server, visibility rights of the plurality of fields of the application form, the visibility rights defining whether the invitee is authorized to view, read, and/or write the at least one field of the plurality of fields.

9. A system comprising:
a processor; and a
memory, wherein the processor and memory are configured to perform operations comprising:
receiving, at a server from a first machine, a request for decomposition of a task, the task comprising completion of an application form comprising a plurality of fields, the plurality of fields comprising a restricted field for which one or more invitees lack access permission, a second field for which information from the one or more invitees is required to complete the task, and a message field for which a message provided by the first machine is displayed to the one or more invitees, the request comprising identifications of the task for which the one or more invitees are allowed to assist with completion of the application form, an invitee of the one or more invitees, and the second field;
decomposing, by the server, the task into a plurality of subtasks, the decomposing comprising verifying that the first machine has permission to decompose the task and identifying at least one restricted field of the plurality of fields for which the invitee lacks an access permission, the decomposing further comprising generating a restricted version of the application form, the restricted version of the application form comprising at least one restricted portion of the application form, the restricted portion having an access control restricting access by the invitee to the at least one restricted field, the access control comprising a hidden field restriction that hides the at least one restricted field from being viewable by the invitee, the decomposing further including providing, by the first machine in the message field, the message viewable by the invitee, the message providing information for assisting with completion of the application form;
inviting the invitee to assist with completion of the at least one second field, the inviting comprising retaining responsibility by the first machine for completion of the task and completion of the subtask;
providing, by the server to a second machine and accessible by the invitee in response to detecting that the invitee has the restricted version of the application form, the at least one second field; and
notifying, by the server to the first machine upon detection by the server, that the invitee has completed the at least one second field.

10. The system of claim 9 further comprising:
determining, at a user management and security system, whether an identity of an invitee of the plurality of invitees is authorized to receive the subtask to which the invitee is invited.

11. The system of claim 9 further comprising:
receiving, at the server, visibility rights of the plurality of fields of the application form, the visibility rights defining whether the invitee is authorized to view, read, and/or write the at least one field of the plurality of fields.

* * * * *